United States Patent
Kim et al.

(10) Patent No.: US 9,848,427 B2
(45) Date of Patent: Dec. 19, 2017

(54) METHOD FOR ALLOCATING RESOURCE FOR DEVICE FOR WIRELESS COMMUNICATION AND BASE STATION FOR SAME

(71) Applicant: LG ELECTRONICS INC., Seoul (KR)

(72) Inventors: Kitae Kim, Seoul (KR); Jaehoon Chung, Seoul (KR); Jinmin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 108 days.

(21) Appl. No.: 14/889,754

(22) PCT Filed: May 27, 2014

(86) PCT No.: PCT/KR2014/004736
§ 371 (c)(1),
(2) Date: Nov. 6, 2015

(87) PCT Pub. No.: WO2014/193152
PCT Pub. Date: Dec. 4, 2014

(65) Prior Publication Data
US 2016/0081091 A1  Mar. 17, 2016

Related U.S. Application Data

(60) Provisional application No. 61/827,735, filed on May 27, 2013.

(51) Int. Cl.
*H04W 72/04* (2009.01)
*H04L 5/14* (2006.01)
(Continued)

(52) U.S. Cl.
CPC ....... *H04W 72/0453* (2013.01); *H04L 5/0037* (2013.01); *H04L 5/0073* (2013.01);
(Continued)

(58) Field of Classification Search
None
See application file for complete search history.

(56) References Cited

U.S. PATENT DOCUMENTS 5,995,832 A * 11/1999 Mallinckrodt ..... H04B 7/18558
455/12.1
6,570,858 B1 * 5/2003 Emmons, Jr. ...... H04B 7/18536
370/280

(Continued)

FOREIGN PATENT DOCUMENTS

GB  2485387 A  5/2012
KR  10-2009-0059790 A  6/2009

OTHER PUBLICATIONS

Choi et al., "Achieving Single Channel, Full Duplex Wireless Communication," MobiCom' 10, Sep. 20-24, 2010, Chicago, USA, 2010, pp. 1-12, XP058230038.

(Continued)

*Primary Examiner* — Bunjob Jaroenchonwanit
(74) *Attorney, Agent, or Firm* — Birch, Stewart, Kolasch & Birch, LLP

(57) ABSTRACT

A method of allocating a resource for user equipments in a base station in a full duplex radio (FDR) communication environment is disclosed. The method includes determining an FDR frequency band for performing FDR communication with a plurality of user equipments, selecting a first user equipment and a second user equipment among the plurality of user equipments, a correlation between the first and second user equipments being less than a threshold value, and allocating a first section as a downlink frequency resource for the first user equipment and an uplink frequency (Continued)

resource for the second user equipment, and allocating a second section as an uplink frequency resource for the first user equipment and a downlink frequency resource for the second user equipment, the first section and the second section being parts of the FDR frequency band.

10 Claims, 7 Drawing Sheets

(51) Int. Cl.
*H04W 72/08* (2009.01)
*H04L 5/00* (2006.01)

(52) U.S. Cl.
CPC .............. *H04L 5/14* (2013.01); *H04W 72/04* (2013.01); *H04W 72/082* (2013.01); *H04L 5/0023* (2013.01); *H04L 5/0048* (2013.01); *H04L 5/1461* (2013.01)

(56) References Cited

U.S. PATENT DOCUMENTS

| | | | |
|---|---|---|---|
| 7,336,626 B1 * | 2/2008 | Barratt ..................... | H04B 7/12 370/281 |
| RE44,089 E * | 3/2013 | Ahmavaara .............. | H04B 1/56 370/328 |
| 8,509,711 B1 * | 8/2013 | Bagley ................... | H04B 1/525 455/103 |
| 2008/0144545 A1 * | 6/2008 | Stanwood ............ | H04B 7/2621 370/295 |
| 2009/0092066 A1 | 4/2009 | Chindapol et al. | |
| 2009/0274059 A1 | 11/2009 | Xing et al. | |
| 2009/0310574 A1 | 12/2009 | Jeon et al. | |
| 2010/0271953 A1 * | 10/2010 | Kim ..................... | H04B 7/0814 370/241 |
| 2012/0034944 A1 * | 2/2012 | Olexa ..................... | H04B 7/12 455/513 |
| 2012/0182948 A1 * | 7/2012 | Huang ................... | H04L 5/001 370/329 |
| 2012/0201173 A1 * | 8/2012 | Jain ........................ | H04B 1/525 370/277 |
| 2013/0021954 A1 | 1/2013 | Montojo et al. | |
| 2013/0022096 A1 * | 1/2013 | Kazmi ............... | H04L 27/2602 375/224 |
| 2013/0114468 A1 * | 5/2013 | Hui ...................... | H01Q 3/2611 370/277 |
| 2013/0230026 A1 * | 9/2013 | Kwon ................. | H04W 76/023 370/336 |
| 2014/0226538 A1 * | 8/2014 | Wang ................... | H04J 11/0036 370/277 |
| 2016/0044689 A1 * | 2/2016 | Wen .................... | H04J 11/0023 370/330 |
| 2016/0241349 A1 * | 8/2016 | Lu ........................ | H04W 24/02 |

OTHER PUBLICATIONS

Ericsson et al., "Channel Reciprocity in FDD Systems including Systems with Large Duplex Distance," TSG-RAN WG1 #60, R1-100853, San Francisco, USA, Feb. 22-26, 2010 (EPO Server date Feb. 16, 2010), 5 pages, XP050598027.

* cited by examiner

[Fig. 4]
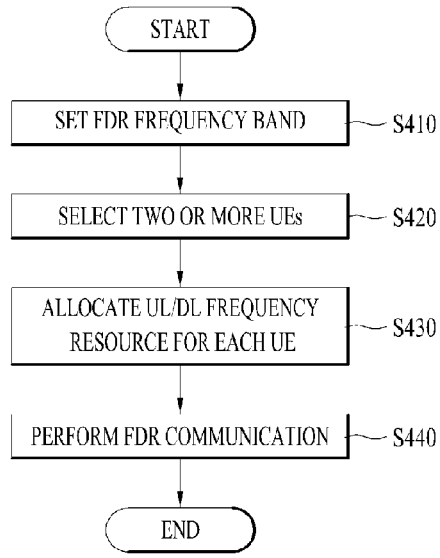
[Fig. 5]
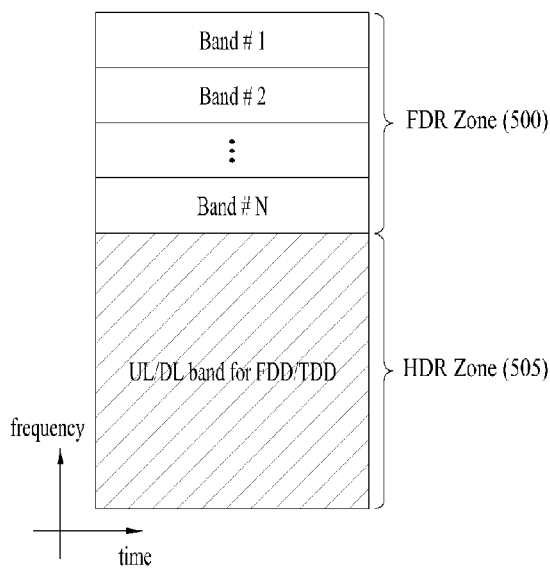
[Fig. 6]
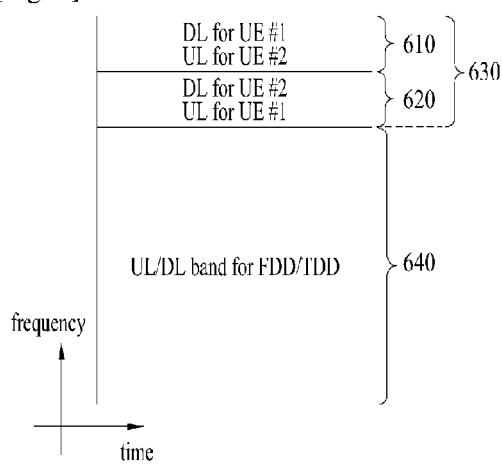

[Fig. 7]
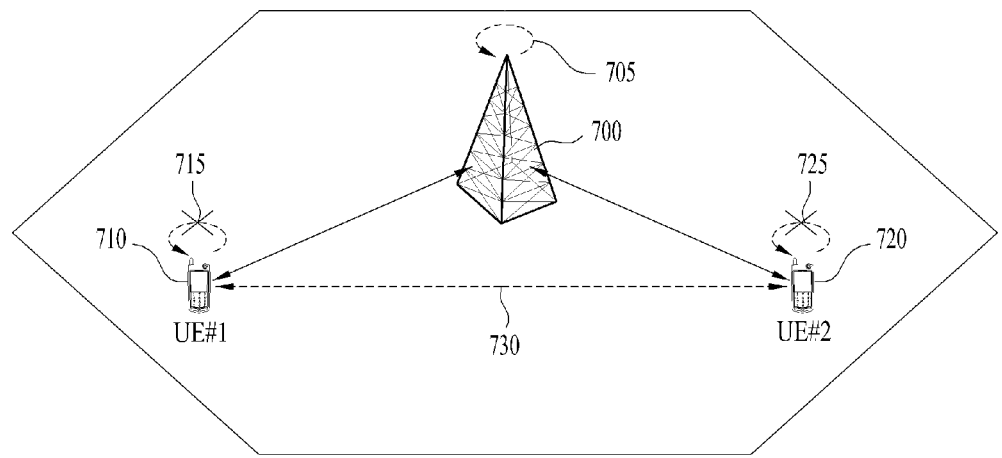
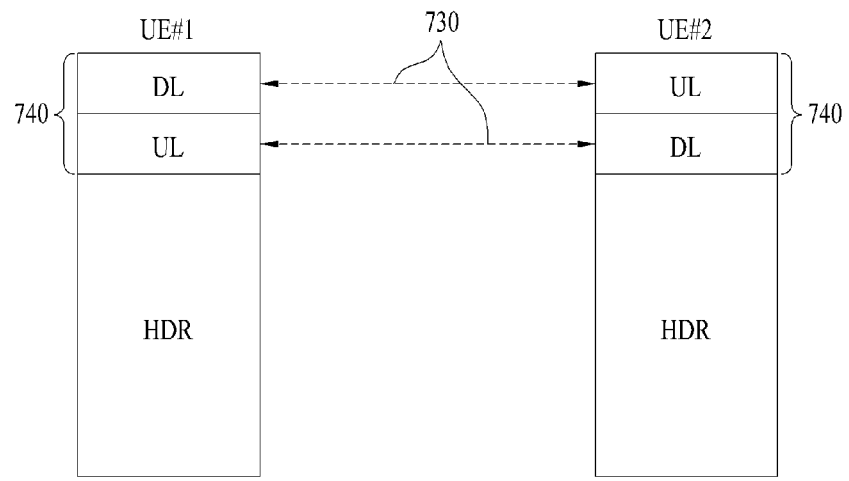
[Fig. 8]
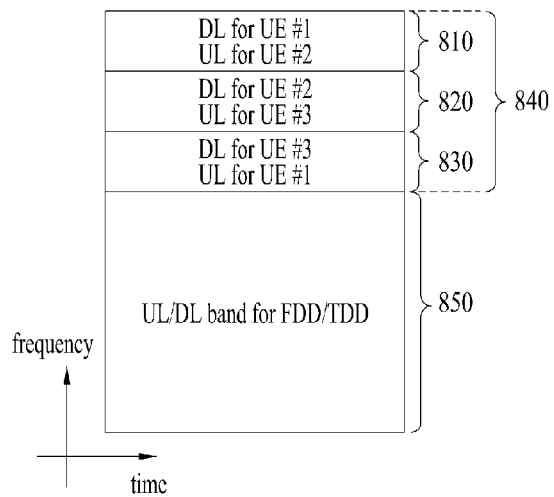

[Fig. 9]
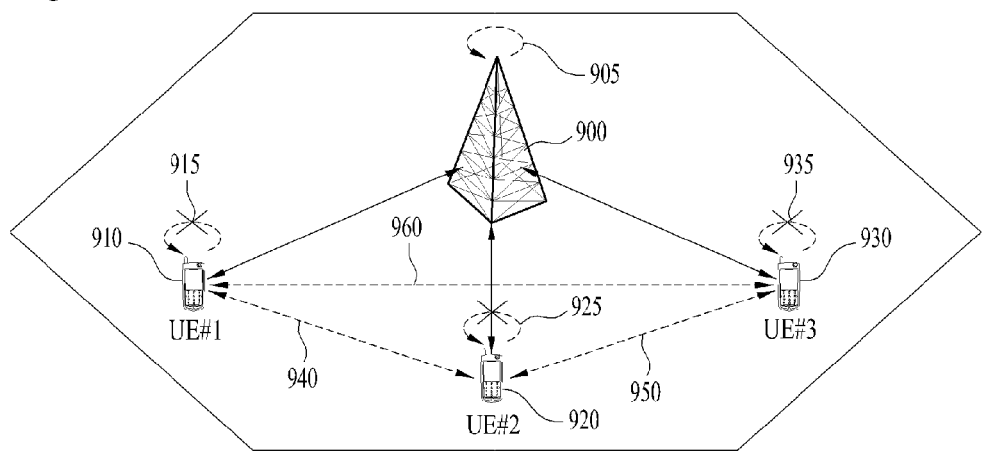
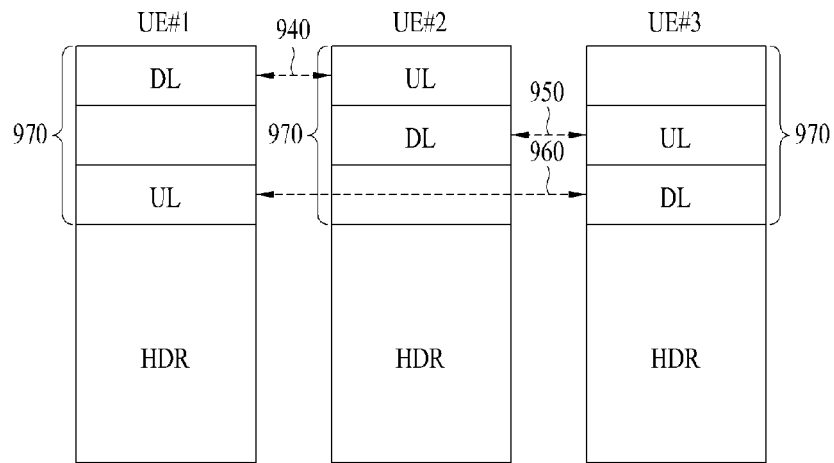
[Fig. 10]
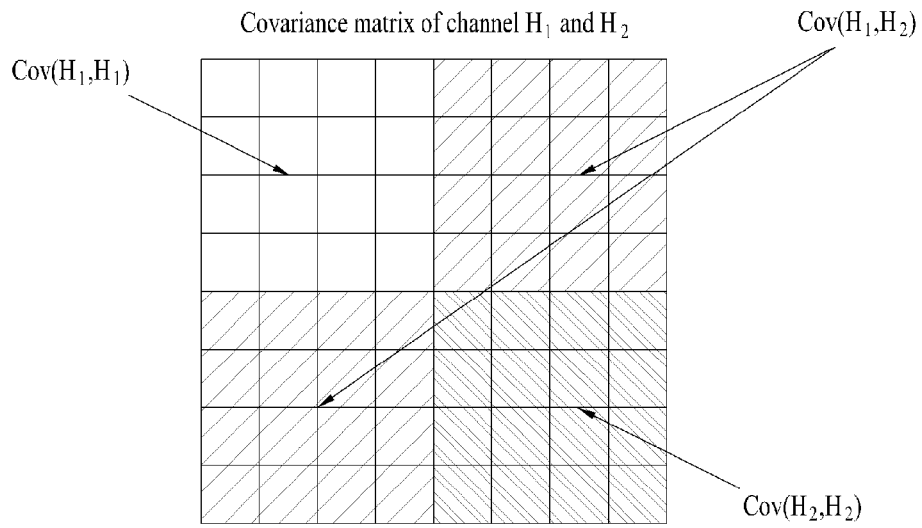

[Fig. 11]
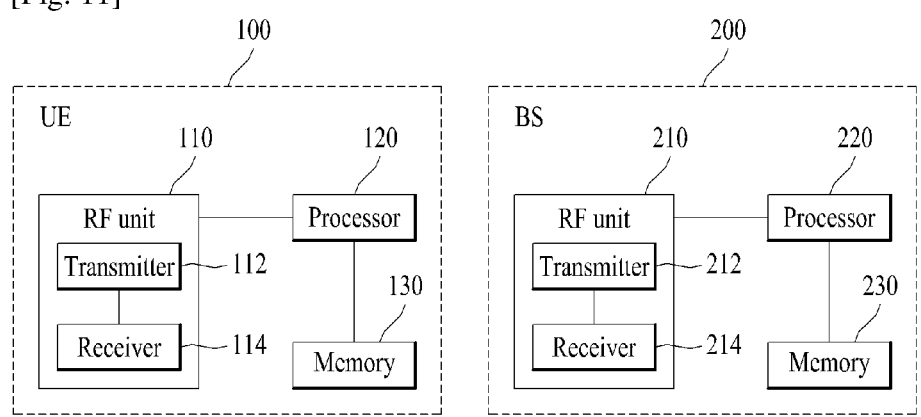

METHOD FOR ALLOCATING RESOURCE FOR DEVICE FOR WIRELESS COMMUNICATION AND BASE STATION FOR SAME

CROSS REFERENCE TO RELATED APPLICATIONS:

This application is the National Phase of PCT International Application No. PCT/KR2014/004736, filed on May 27, 2014, which claims priority under 35 U.S.C. 119(e) to U.S. Provisional Application No. 61/827,735, filed on May 27, 2013, all of which are hereby expressly incorporated by reference into the present application.

TECHNICAL FIELD

The present invention relates to a method of allocating a resource to a device for wireless communication in a base station and the base station for the same.

BACKGROUND ART

A base station or a mobile terminal performs communication using a frequency division duplex (FDD) scheme, in which a transmission/reception resource of a signal is divided into frequencies, and a half duplex radio (HDR) scheme which employs time division duplex (TDD), which the transmission/reception resource is divided into times.

However, in the HDR communication scheme, terminals and/or base stations cannot perform transmission and reception simultaneously within the same frequency/time resource. Accordingly, introduction of the FDR communication scheme has been proposed to efficiently use the resources. FDR communication refers to a scheme in which base stations and/or terminals perform transmission and reception of different signals simultaneously in the same frequency/time resource region.

Since base stations and/or terminals perform transmission and reception simultaneously through the same resource region in a communication environment with the FDR scheme, self interference, which refers to reception of a signal from a base station or a mobile terminal through the receive antenna of the same base station or mobile terminal, occurs, and several methods have been proposed to address self interference.

DISCLOSURE OF INVENTION

Technical Problem

The present invention is proposed to solve the technical problems as described above. An object of the present invention to provide an improved method of allocating resources for user equipments in a base station in a communication environment that employs the FDR scheme.

Another object of the present invention to implement interference cancellation occurring in the FDR communication and efficient distribution of resources.

Another object of the present invention to readily and efficiently implement interference cancellation by forming an FDR communication environment in a specific frequency band.

Objects of the present invention are not limited to the aforementioned ones. Other objects of the invention will become apparent to those having ordinary skill in the art upon examination of the following description of embodiments of the present invention given.

Solution to Problem

Method for allocating resource for device for wireless communication is disclosed herein to solve above-mentioned technical problems. And, base station for performing the same is also disclosed.

Advantageous Effects of Invention

As apparent from the embodiments of the present invention, the present invention may have effects as follows.

First, communication resources may be efficiently utilized and interference may be cancelled in the FDR communication environment.

Second, the process of interference cancellation in a user equipment may be omitted, and the process of interference cancellation in the base station may be simplified. Thereby, implementation of an interference cancellation system may be facilitated.

It will be appreciated by persons skilled in the art that that the effects that can be achieved through the embodiments of the present invention are not limited to those described above and other advantages of the present invention will be more clearly understood from the following detailed description. That is, unintended effects according to implementation of the present invention may be drawn by a person skilled in the art through the embodiments of the present invention.

BRIEF DESCRIPTION OF DRAWINGS

The accompanying drawings, which are included to provide a further understanding of the invention, illustrate embodiments of the invention and together with the description serve to explain the principle of the invention. The technical features of the present invention are not limited to a specific drawing, and some of the features illustrated in the respective drawings may be combined to constitute a new embodiment. The reference numerals in the drawings represent structural elements. In the drawings:

FIG. 4 is a flowchart depicting a resource allocation method according to one embodiment of the present invention;

FIG. 5 illustrates setting an FDR frequency band according to one embodiment of the present invention;

FIG. 6 illustrates allocation of a frequency band for two user equipments according to one embodiment of the present invention;

FIG. 7 illustrates occurrence of interference in allocating a frequency band for two user equipments, in relation to one embodiment of the present invention;

FIG. 8 illustrates allocation of a frequency band for three user equipments according to one embodiment of the present invention;

FIG. 9 illustrates occurrence of interference according to allocation of a frequency band for three user equipments, in relation to one embodiment of the present invention;

FIG. 10 illustrates measurement of a correlation between user equipments performed by a base station; and FIG. 11 is a block diagram illustrating configurations of a user equipment and a base station related to one embodiment of the present invention.

BEST MODE FOR CARRYING OUT THE INVENTION

Figure 1:
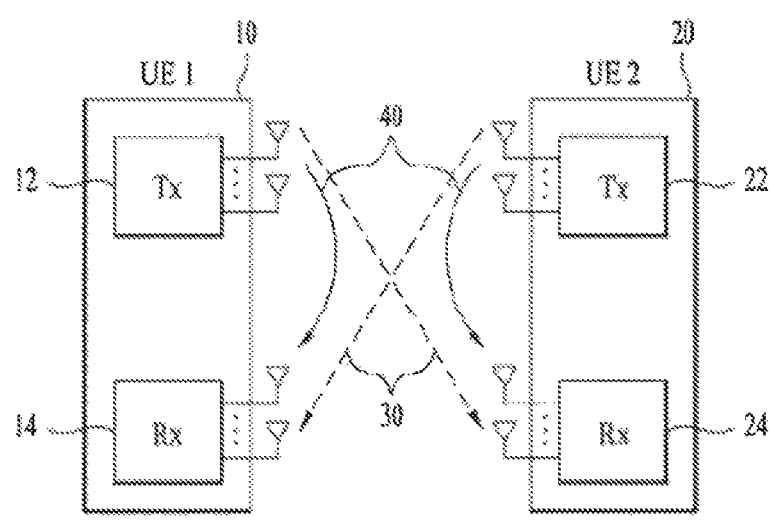
FIG. 1 is a diagram illustrating a full duplex radio (FDR) communication scheme related to one embodiment of the present invention.

A method of allocating a resource for user equipments in a base station in a full duplex radio (FDR) communication environment including determining a FDR frequency band for performing FDR communication with a plurality of user equipments, selecting a first user equipment and a second user equipment among the plurality of user equipments, a correlation between the first and second user equipments being less than a threshold value, and allocating a first section as a downlink frequency resource for the first user equipment and an uplink frequency resource for the second user equipment, and allocating a second section as an uplink frequency resource for the first user equipment and a downlink frequency resource for the second user equipment, wherein the first section and the second section being parts of the FDR frequency band.

The method may further include performing downlink communication with the first user equipment and uplink communication with the second user equipment simultaneously through the first section, and performing uplink communication with the first user equipment and downlink communication with the second user equipment simultaneously through the second section.

The method may further include receiving an uplink pilot signal from the plurality of user equipments, and measuring the correlation using the uplink pilot signal.

The correlation may indicate a distance between the user equipments within coverage of the base station, the correlation decreasing as the distance increases.

The FDR frequency band may be a frequency band allowing self interference cancellation to be performed to a degree greater than or equal to a threshold value through an antenna cancellation technique.

The selecting may include selecting a third user equipment in addition to the first user equipment and the second user equipment, a correlation between the first, second and third user equipments being less than a threshold value, and the allocating includes allocating the first section as the downlink frequency resource for the first user equipment and the uplink frequency resource for the second user equipment, allocating the second section as the downlink frequency resource for the second user equipment and an uplink frequency resource for the third user equipment, and allocating a third section as a downlink frequency resource for the third user equipment and an uplink frequency resource for the first user equipment, the third section being another part of the FDR frequency band.

In another aspect of the present invention, provided herein is a base station for allocating a resource for a user equipment in a full duplex radio (FDR) communication environment, including a transmitter, a receiver, and a processor connected to the transmitter and the receiver to support resource allocation to the user equipment, wherein the processor determines a FDR frequency band for conducting FDR communication with a plurality of user equipments, selects a first user equipment and a second user equipment among the plurality of user equipments, a correlation between the first and second user equipments being less than a threshold value, and allocates a first section as a downlink frequency resource for the first user equipment and an uplink frequency resource for the second user equipment, and a second section as an uplink frequency resource for the first user equipment and a downlink frequency resource for the second user equipment, wherein the first section and the second section being parts of the FDR frequency band.

The aforementioned aspects of the present invention are merely a part of preferred embodiments of the present invention. Those skilled in the art will derive and understand various embodiments reflecting the technical features of the present invention from the following detailed description of the present invention and the drawings.

Mode for the Invention

Although the terms used in this specification are selected, as much as possible, from general terms that are widely used at present while taking into consideration of the functions of the elements obtained in accordance with one embodiment, these terms may be replaced by other terms based on intensions of those skilled in the art, customs, emergence of new technologies, or the like. Also, in a particular case, terms that are arbitrarily selected by the applicant may be used. In this case, meanings of these terms will be disclosed in detail in the corresponding part of the description of the invention. Accordingly, the terms used herein should be defined based on practical meanings thereof and the whole content of this specification, rather than based on names of the terms.

The embodiments described below are constructed by combining elements and features of the present invention in a predetermined form. The elements or features may be considered as being selective, if not explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features from another embodiment.

In describing the drawings, procedures or steps which may obscure the main point of the present invention will not be described. Nor will description of procedures or steps which may be understood by those having ordinary skill in the art be given.

In this specification, a term "comprise" or "include" should be understood as not pre-excluding existence of one or more other constituents, if not stated otherwise. In addition, the terms "unit", "-er", "module", etc. signify a unit that processes at least one function or operation and may be implemented in hardware, software, or a combination of hardware and software. As used in the specification and appended claims, the terms "a, "an", "one", "the" and other similar terms include both singular and plural referents, unless the context clearly dictates otherwise.

In this specification, embodiments of the present invention are described, focusing on the relationship between a base station (BS) and a mobile station (MS) in transmission/reception of data. Herein, the base station serves a terminal node of a network that directly performs communication with mobile stations. In this document, an operation described as being performed by the base station may be performed by an upper node of the base station in some cases.

That is, in a network comprised of a plurality of network nodes including a BS, various operations performed for communication with an MS may be performed by the BS, or network nodes other than the BS. The term "base station" may be replaced with "fixed station", "Node B", "eNode B (eNB)", "advanced base station (ABS)", or "access point".

In addition, the term "mobile station (MS)" may be replaced with a term "user equipment (UE)", "subscriber station (SS)", "mobile subscriber station (MSS)", "mobile terminal", "advanced mobile station (AMS)", or "terminal".

A transmitter refers to a fixed and/or mobile node that provides a data service or a voice service, and a receiver refers to a fixed and/or mobile node that receives a data service or a voice service. Therefore, an MS may serve as a transmitter and a BS may serve as a receiver, on uplink. Likewise, the MS may serve as a receiver and the BS may serve as a transmitter, on downlink.

The embodiments of the present invention may be supported by standard documents disclosed for at least one of an Institute of Electrical and Electronics Engineers (IEEE) 802.xx system, a 3rd Generation Partnership Project (3GPP) system, a 3GPP Long Term Evolution (LTE) system, a 3GPP LTE-Advanced (LTE-A) system, and a 3GPP2 system, which are wireless access systems. That is, obvious steps or portions which are not described in the embodiments of the present invention may be supported by the above documents.

All terms used herein may be explained by the standard documents. Particularly, the embodiments of the present invention may be supported by at least one of P802.16e-2004, P802.16e-2005, P802.16.1, P802.16p, and P802.16.1b, which are standard documents of the IEEE 802.16 system.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

In the following description of the embodiments of the present invention, specific terms are used in order to provide a thorough understanding of the present invention. Those terms may be changed without departing from the spirit of the present invention.

1. FDR Communication

FIG. 1 is a diagram illustrating a full duplex radio (FDR) communication scheme related to one embodiment of the present invention. In the FDR communication scheme, a BS and/or a UE perform uplink (UL)/downlink (DL) communication using the same frequency/time resource. Thereby, the BS and/or the UE transmit and receive difference signals at the same time.

FIG. 1 shows UE 1 10 and UE 2 20 which perform FDR wireless communication. Referring to FIG. 1, UE 1 10 transmits a signal 30 to a receiver 24 of UE 2 20 through a transmitter 12, while receiving a signal 30 from a transmitter 22 of UE 2 20 through a receiver 14 thereof. The signal transmitted from UE 1 10 to UE 2 20 and the signal 30 transmitted from UE 2 20 to UE 1 10 are desired signals, which are indicated by dotted lines in FIG. 1.

UE 1 10 uses the same frequency/time resource on the UL/DL, and the transmitter 12 and the receiver 14 of UE 1 10 are positioned physically close to each other. Accordingly, a signal 40 transmitted from the transmitter 12 of UE 1 10 may be directly input to the receiver 14 of UE 1 10. The signal 40 received from the transmitted 12 of UE 1 10 by the receiver 14 of UE 1 10 and the signal 40 received from the transmitter 22 of UE 2 20 by the receiver 24 of UE 2 20 are referred to as interference signals, which are indicated by solid lines in FIG. 1.

In other words, in an FDR communication system, self interference, referring to direct introduction of a transmitted signal of a UE into the reception antenna of the UE itself, may occur. The received self interference signal has a relatively strong intensity due to a close distance between the transmitter and the receiver. Accordingly, a process of self interference cancellation is essentially included in the FDR communication system.

For simplicity, the following description is given of UE 1 10 and UE 2 20. However, it may also be applicable to communication between a UE and a BS and between a BS and another BS.

2. Interference Cancellation in FDR Communication

Figure 2:
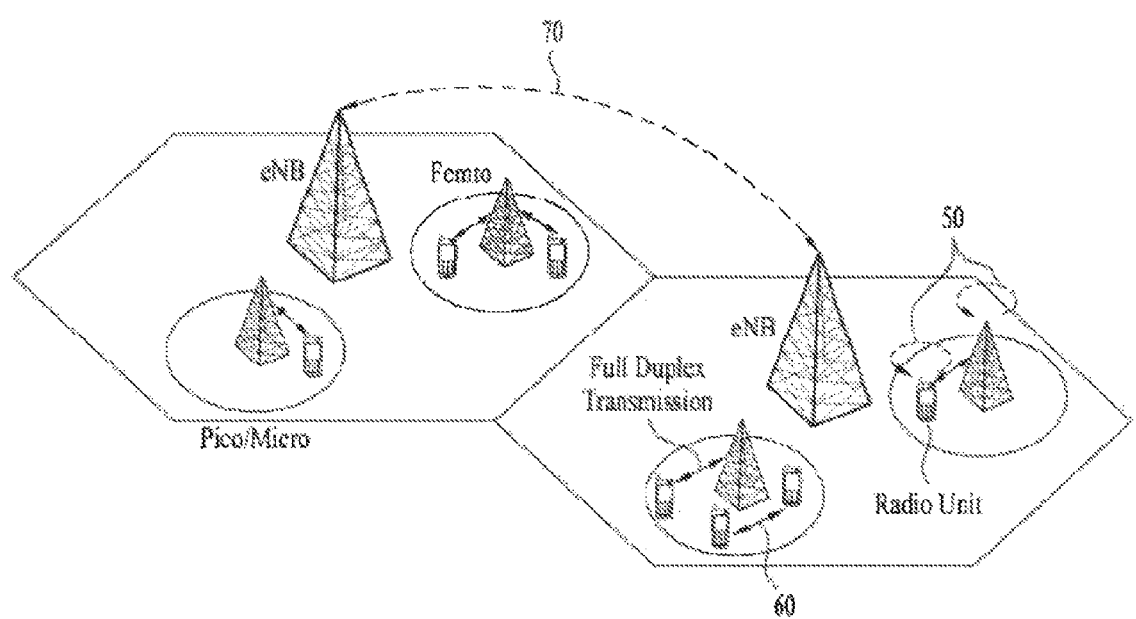
FIG. 2 is a diagram illustrating interference occurring according to FDR communication in a multi-cell environment, in relation to one embodiment of the present invention.

FIG. 2 is a diagram illustrating interference occurring according to FDR communication in a multi-cell environment, in relation to one embodiment of the present invention. The multi-cell environment refers to an environment in which various types of micro cells such as a pico cell and a femto cell are operatively connected with a macro cell. The multi-cell environment may represent a hierarchical cell structure in which micro cells for low power/short range communication coexist over a homogeneous network, or a heterogeneous cell structure.

Interference expected according to introduction of FDR communication scheme in the multi-cell environment may include self interference (self-user interference) 50, illustrated in FIG. 1, multi-user interference 60 occurring between nearby UEs, and inter-BS interference 60 occurring between BSs sharing an UL/DL resource. FIG. 2 shows the self interference 50, the multi-user interference 60, and the inter-BS interference 70.

First, the self interference 50 will be described. The transmitter and receiver of a UE or a BS transmit and receive a signal using the same time/frequency resource. As described above, the transmitter and receiver of the UE or BS are close to each other, and accordingly the self interference 50 may occur when a signal is introduced from the transmitter to the receiver in the same UE or BS.

Next, the multi-user interference 60 may occur when two or more UEs positioned close enough to affect each other communicate with each other using the same time/frequency resource. FIG. 2 exemplarily shows the multi-user interference 60 occurring between two UEs.

Lastly, as shown in FIG. 2, inter-BS interference 70, which is similar to the aforementioned multi-user interference, may occur between two or more BSs, In the FDR communication environment, cancellation of aforementioned inferences is essential. Especially, it is important to cancel self interference occurring with an intensity stronger than that of a reception signal expected by the receiver. That is, self interference is about 60-90 dB stronger than the signal that the receiver receivers from another UE or BS. The self interference may be cancelled through such techniques as antenna cancellation, analog cancellation, and digital cancellation, which will be described below.

Figure 3:
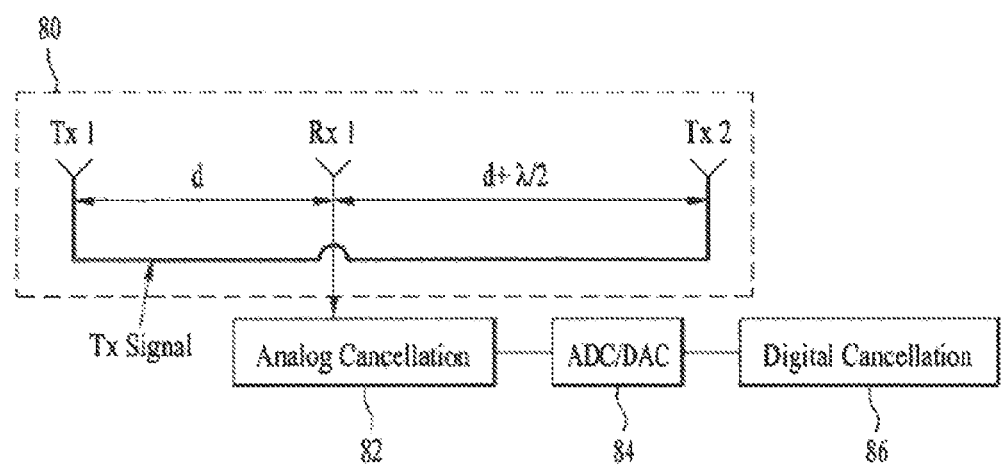
FIG. 3 is a diagram illustrating interference cancellation related to one embodiment of the present invention.

FIG. 3 is a diagram illustrating interference cancellation related to one embodiment of the present invention.

First, digital cancellation 86 is applied before signals processed in a base band are converted into analog signals through a digital-to-analog converter 84 (DAC) or after received signals are converted into digital signals through an analog-to-digital converter (ADC) 84. In the process of the digital cancellation 86, the beamforming technique may be applied to cancel the interference. With this technique, interference cancellation in the range of about 20-25 dB is possible.

Next, analog cancellation 82 is applied after a digital signal to be transmitted is converted into an analog signal or before a received radio frequency (RF) signal is converted into a digital signal. The analog cancellation 82 may be implemented by adding an inference cancellation signal created through measurement of a self interference signal to a signal of the receiver and thereby cancelling the interference signal received directly from the transmitter. In the analog cancellation 82, interference cancellation of about 45 dB is possible.

Lastly, in the antenna cancellation 80, interference is canceled by adjusting the phases of signals transmitted from two or more transmit antennas. As shown in FIG. 3, if two transmit antennas are space apart from the receive antenna such that the distance between one transmit antenna and the receiver differs by "$\lambda/2$" from the distance between the other transmit antenna and the receive antenna, the signals received from the two transmit antennas through the receive antenna has a phase difference of 180 degrees. Thereby, the receive antenna may cancel the interference signal by adding the two signals, which become 0.

In general, the technique of antenna cancellation 80 has low complexity and is thus easiest to implement. However, the maximum interference cancellation performance of the antenna cancellation 80 is about 20 to 30 dB, while a self interference cancellation performance of about 70 dB is needed for the FDR system. Accordingly, self interference cancellation may be achieved through a combination of the aforementioned three techniques. However, there is a specific communication environment in which the performance of the antenna cancellation 80 cam be maximized.

As the bandwidth of a system decrease and the center frequency is shifted to a higher frequency, the performance of the antenna cancellation 80 drastically increases. Accordingly, if a high frequency narrow band is allocated to the FDR communication, a sufficient performance of self interference cancellation may be ensured by the antenna cancellation 80 alone. Accordingly, the FDR performance may be ensured, and implementation complexity may be lowered. A high frequency band of transmission is directed to broadband communication, in which transmission is implemented using a wide frequency band. Thereby, if a region of the high frequency band of transmission is set as a band for the FDR communication, an environment advantageous for self interference cancellation through the antenna cancellation 80 may be created, and thus a sufficient performance of self interference cancellation may be achieved.

3. Resource Allocation Method

Hereinafter, a description will be given of a resource allocation method according to one embodiment of the present invention, with reference to FIGS. 4 to 9. FIG. 4 illustrates a method with which a BS allocates a resource for a UE in order to implement inference cancellation.

In step S410, the BS determines an FDR frequency band. The BS may select a part or all of an available frequency band as an FDR frequency band, or may set a high frequency narrow band to the FDR frequency band as described above. For example, the BS may determine the FDR frequency band in a partial frequency of the entire frequency band of the system band which enables self interference cancellation through antenna cancellation alone to an extent required by the system or a higher extent.

According to one embodiment, the BS may divide the FDR frequency band into plural sub-bands or regions to be allocated for plural UEs. That is, the FDR frequency band may include two or more sub-bands/regions, which may be allocated as frequency resources for UL and DL of different UEs, respectively. Specific examples will be described with reference to FIGS. 6 to 9.

In step S420, the BS selects two or more UEs among a plurality of UEs based on a correlation between the UEs connected to the BS to perform communication. The BS may take account of the correlation between the UEs in order to exclude occurrence of multi-user interference, which is interference between UEs.

For example, the BS may receive UL pilot signals from the UEs and measure the correlation between the UEs using the received signals. Subsequently, the BS may compare the value of the measured correlation between the UEs with a predetermined threshold value, thereby estimating physical distances between the UEs. That is, UEs having a correlation less than the threshold value means that the physical distances therebetween is greater than or equal to the threshold value. If UEs are spaced a far distance from each other, the influence they have on each other may be low, and thus the correlation therebetween may be measured to be low.

The BS may select UEs having a correlation less than the threshold value, thereby selecting two UEs which are spaced a sufficient distance from each other so as not to affect each other or cause interference even if communication is implemented using the same frequency band. A specific embodiment of measurement of a correlation between the UEs that the BS performs using the pilot signals received from the UEs will be described with reference to FIG. 10.

In step S430, the BS allocates a UL/DL frequency resource for each of the two or more UEs selected in step S420. The BS may allocate the FDR frequency band set in step S410 as a frequency resource that may be by each of the UEs. For example, it may allocate sub-regions of the FDR frequency band as UL/DL frequency resources for the UEs.

According to one embodiment of the present invention, in allocating the frequency resources for the UEs, the BS may allocate the frequency resources such that self interference does not occur for a specific UE. For example, the BS may allocate different sub-regions of the frequency band as a UL frequency resource and a DL frequency resource for a specific UE. Thereby, the UEs perform communication, similar to HDR communication, with the BS and self interference does not occur. That is, concerns about self interference may be lessened for the UEs in communicating with the BS.

At the same time, the BS may allocate the UL frequency resource and DL frequency resource such that they are alternated between the selected UEs. Alternately allocating frequency resources for the UEs means that an UL resource region for a first UE and a DL resource region for a second UE are allocated to one sub-region of the frequency band. By dividing and alternately allocating the FDR frequency band for the UEs, the efficiency of the antenna cancellation performed by the BS may be improved.

In step S440, the BS performs FDR communication with the UEs. That is, the BS may perform FDR communication with two or more UEs using frequency resources allocated for the UEs. For example, the BS may perform UL communication with the first UE and DL communication with the second UE, through a first sub-region, and may perform DL communication with the first UE and UL communication with the second UE, through a second sub-region.

If the resources are allocated for the UEs in the FDR communication system according to the method described above, the BS sets the high frequency narrow band as the FDR frequency band, and thus the performance of the antenna cancellation may be improved. Thereby, the BS may improve the efficiency of cancellation of self interference due to FDR communication. In addition, the UL frequency resource and DL frequency resource are separated from each other for the UEs, and accordingly self interference does not occur. In addition, as the frequency resources are selected according to the correlation, UEs whose influence on each other is ignorable share a frequency resource. Thereby, inter-UE interference is also prevented.

Through the method described above, the BS may limit a communication environment having self interference thereto. That is, as the UEs perform HDR communication with the BS, the load of interference cancellation may be lessened for the UEs. Moreover, the BS sufficiently cancels the self interference through the antenna cancellation, while performing FDR communication with the UEs. Hereinafter, a description will be given of a specific embodiment in which the BS allocates a frequency band for the UEs.

FIG. 5 illustrates setting an FDR frequency band in the BS according to one embodiment of the present invention. The BS determines a part of the entire system frequency band as an FDR frequency band 500, and determines the other part of the band as an HDR frequency band 505. As described above, the FDR frequency band 500 may include two or more sub-bands or sub-regions.

FIG. 6 illustrates allocation of a frequency band for two UEs according to one embodiment of the present invention. In FIG. 6, the BS determines a part of an available frequency band as a FDR frequency band 630. The BS may utilize the remaining band 640 other than the FDR frequency band 630 as an HDR frequency band.

The BS may receive pilot signals from plural UEs and measure a correlation between the UEs using the received pilot signals. The BS selects a first UE (UE #1) and a second terminal (UE #2) whose measured correlation is less than a threshold value.

Subsequently, the BS may divide the FDR frequency band 630 to allocate the frequency resources for the first UE and the second UE. As shown in FIG. 6, the BS may allocate a region 610, which is a part of the region of the FDR frequency band 630, for a DL frequency resource of the first UE and a UL frequency resource of the second UE, and allocate a region 620 for a UL frequency resource of the first UE and a DL frequency resource for the second UE.

Thereby, the BS may perform FDR communication with the first UE and the second UE through the region 610 and the region 620. That is, the BS may perform DL communication with the first UE and UL communication with the second UE simultaneously through the region 610, may perform UL communication with the first UE and DL communication with the second UE simultaneously through the region 620.

In the meantime, the first UE and the second UE are assigned respectively with a UL frequency resource and a DL frequency resource, which are separated from each other, similar to the HDR communication environment. Accordingly, each of the first UE and the second UE may communicate with the BS without self interference. The BS may set a frequency band in the high frequency narrow band as the FDR frequency band 630, thereby cancelling self interference through the antenna cancellation alone.

Thereby, the BS may sufficiently cancel the self interference and perform the FDR communication even though the UL/DL frequency resources are separately allocated for the first UE and the second UE. Meanwhile, the UEs perform communication with the BS according to the HDR communication scheme, and thus self interference does not occur. the first UE and the second UE have a correlation less than a threshold value, which means that the two UE are spaced a sufficient physical distance from each other. Thereby, influence that the two UE have on each other is ignorable, and thus the two UE may perform communication with the BS, ignoring the multi-user interference.

FIG. 7 illustrates occurrence of interference in allocating a frequency band for two UEs, in relation to one embodiment of the present invention.

As described with reference to FIG. 6, a BS 700 selects a first UE 710 and a second UE 720 having a correlation less than a threshold value. Thereby, the multi-user interference 730 between the first UE 710 and the second UE 720 may be ignorable as it is attenuated according to the distance between the UEs.

Subsequently, the BS 700 may allocate a radio frequency resource for the first UE 710 and the second UE 720. For example, the BS 700 may allocate a region (a first region) of the FDR frequency band 740, for a DL frequency resource of the first UE 710 and a UL frequency resource of the second UE 720. In addition, the BS may allocate another region (a second region) of the FDR frequency band 740, for a UL frequency resource of the first UE 710 and a DL frequency resource of the second UE 720.

Since the BS 700 allocates the FDR frequency band 740 for the first UE 710 and the second UE 720 by diving the FDR frequency band 740 into a UL resource and a DL resource. Self interference 715, 725 does not occur in the first UE 710 and the second UE 720. In the meantime, the BS 700 may allocate, as the FDR frequency band, a high frequency narrow band in which the efficiency of the antenna cancellation is greater than or equal to a threshold value. Thereby, the self interference 705 in the BS 700 may be sufficiently cancelled through the antenna cancellation.

In addition, if the correlation between the selected UEs changes due to movement of the UEs, the BS 700 may select new UEs which are positioned within the coverage and have a correlation less than the threshold value and allocate the frequency resources again. That is, it is possible for the BS 700 to implement dynamic link reestablishment through the flexible resource allocation.

FIG. 8 illustrates allocation of a frequency band for three UEs according to one embodiment of the present invention. The BS may determine a part of an available frequency band as a FDR frequency band 840, and determine the remaining part of the frequency band as an HDR frequency band 850.

Subsequently, the BS selects a first UE and a second UE which have a correlation less than the threshold value and allocates an FDR frequency band 840 for the UEs. That is, the BS may allocate a region 810 (a first region) of the frequency band for a DL frequency resource of the first UE and a UL frequency resource of the second UE, allocate a region 820 (a second region) for a DL frequency resource of the second UE and a UL frequency resource of a third UE, and allocate a region 830 (a third region) for a DL frequency resource of the third UE and a UL frequency resource of the first UE.

The BS performs FDR communication with the first UE, the second UE, and the third UE through the regions 810, 820 and 830. That is, the BS may perform DL communication with the first UE and UL communication with the second UE simultaneously through the region 810, perform DL communication with the second UE and UL communication with the third UE simultaneously through the region 820, and perform DL communication with the third UE and UL communication with the first UE simultaneously through the region 830.

As described above, the BS cancels self interference resulting from the FDR communication through the antenna cancellation, and each of the UEs performs HDR communication for the BS, and thus does not undergo self interference.

FIG. 9 illustrates occurrence of interference according to allocation of a frequency band for three UEs, in relation to one embodiment of the present invention. As described above with reference to FIG. 8, a BS 900 selects a first UE 910, a second UE 920, and a third UE 930 which have a correlation with each other less than the threshold value.

Thereby, each of the three USs 910, 920 and 930 uses a part of the FDR frequency band 970 allocated thereto, interference does not occur between the UEs. That is, the multi-user interference 940 between the first UE 910 and the second UE 920, the multi-user interference 950 between the second UE 920 and the third UE 930, and the multi-user interference 960 between the third UE 930 and the first UE 910 are ignorable due to attenuation according to the distance.

In addition, the BS 900 may allocate a UL/DL frequency band for each of the three UEs such that self interference 915, 925, 935 does not occur in the UEs. Self interference 905 of the BS 900 may be cancelled through implementation of the antenna cancellation.

FIG. 10 illustrates measurement of a correlation between UEs performed by a BS. As described above with reference to FIGS. 4 to 9, the BS may measure a correlation between the UEs using pilot signals received from the UEs.

First, the BS may acquire a covariance matrix for a channel between the BS and the UEs through Equation 1 given below.

$$\text{Cov}(H) = E[HH^H] \qquad \text{Equation 1}$$

In Equation 1, E denotes a statistical expectation, and H denotes a channel between the BS and UEs measured through pilot signals. H^H denotes a conjugate transpose matrix of H, i.e., Hermitian.

The BS may manage the information about the channel measured through the pilot signals received from a plurality of UEs as in Equation 2 given below.

$$H' = \begin{bmatrix} H_1 \\ H_2 \\ \vdots \end{bmatrix} \qquad \text{Equation 2}$$

In Equation 2, H_1 may denote a wireless channel between the first UE and the BS, and H_2 may denote a wireless channel between the second UE and the BS. The BS may collect information about channels between the BS and the UEs according to Equation 2 and manage the information by stacking it.

Next, a description will be given of an embodiment in which the BS measures a correlation to two UEs using Equation 1 and Equation 2. The BS may use Equation 3 given below that is drawn from Equation 1 and Equation 2 to measure a correlation to the first UE and the second UE.

$$\text{Cov}(H') = E[H'(H')^H] = E\left[\begin{bmatrix} H_1 \\ H_2 \end{bmatrix}\begin{bmatrix} H_1 \\ H_2 \end{bmatrix}^H\right] \qquad \text{Equation 3}$$

Equation 3 represents a covariance matrix for two UEs. The matrix having the structure shown in FIG. 10 may represent a covariance matrix measured by the BS for two UEs having four transmit antennas and receive antennas.

The BS measure a correlation of the first UE and the second UE based on the values in the Cov(H_1,H_2) region in the acquired covariance matrix for all the UEs. By calculating the average of the values in the Cov(H_1,H_2) region, the BS may calculate the correlation between the first UE and the second UE.

In addition, the BS may select only a pair of specific antennas of the UEs to measure the correlation value. For example, if the BS measures a correlation from the channel between antenna #1 of the first UE and antenna #1 of the second UE, the correlation between the two UEs may be measured as in Equation 4 given below.

$$\text{Cov}(h_{11}^1,(h_{11}^2)^*)=E[h_{11}^1,(h_{11}^2)^*)] \qquad \text{Equation 4}$$

If the correlation between the UEs is measured to be greater than or equal to the threshold value through the covariance matrix according to the equations given above, the BS may estimate that the two UEs are at close distance from each other and determine that the influence the UEs have on each other is significant. On the other hand, if the correlation is less than the threshold value, the BS may determine that the two UEs are spaced a far distance from each other such that the multi-user interference is ignorable.

4. Device Configuration

FIG. 11 is a block diagram illustrating configurations of a UE and a BS related to one embodiment of the present invention.

In FIG. 11, each of the UE 100 and the BS 200 may include a radio frequency (RF) unit 110, 210, a processor 130, 230, and a memory 130, 230. While FIG. 9 illustrates a one-to-one communication environment between the UE 100 and the BS 200, a communication environment between plural UEs and the BS 200 may also be implemented.

Each RF unit 110, 210 may include a transmitter 112, 212 and a receiver 114, 214. The transmitter 112 and the receiver 114 of the UE 100 may be configured to transmit and receive signals with the BS 200 and other UEs, and the processor 120 may be functionally connected with the transmitter 112 and the receiver 114 to control a process in which the transmitter 112 and the receiver 114 transmit and receive signals with other devices. In addition, the processor 120 may perform various kinds of processing for a signal to be transmitted and then transmit the signal to the transmitter 112, and may also perform processing of the signal received by the receiver 114.

When necessary, the processor 120 may store information contained in an exchanged message in a memory 130. With this structure, the UE 100 may implement various embodiments of a method of the present invention as described above.

The transmitter 212 and the receiver 214 of the BS 200 may be configured to transmit and receive signals with other BSs and UEs, and the processor 220 may be functionally connected with the transmitter 212 and the receiver 214 to control a process in which the transmitter 212 and the receiver 214 transmit and receive signals with other devices. In addition, the processor 220 may perform various kinds of processing for a signal to be transmitted and then transmit the signal to the transmitter 212, and may also perform processing of the signal received by the receiver 214. When necessary, the processor 220 may store information contained in an exchanged message in a memory 230. With this structure, the BS 200 may implement various embodiments of a method of the present invention as described above.

The processor 120 and 220 of the UE 100 and the BS 200 instruct (e.g., control, adjust, and manage) the operations of the UE 100 and the BS 200, respectively. The processors 120 and 220 may be connected to the memories 130 and 230 that store program codes and data. The memories 130 and 230 are connected to the processors 120 and 220 and store an operating system, an application, and general files.

The processors 120 and 220 of the present invention may also be referred to as controllers, microcontrollers, microprocessors, microcomputers, or the like. The processors 120 and 220 may be achieved by hardware, firmware, software, or a combination thereof. In a hardware configuration for an embodiment of the present invention, the processors 120 and 220 may application specific integrated circuits (ASICs) or digital signal processors (DSPs), digital signal processing devices (DSPDs), programmable logic devices (PLDs), and field programmable gate arrays (FPGAs) that are configured to implement the present invention.

The method according to embodiments of the present invention as described above may be embodied in a program that is executable in a computer and implemented in a general-purpose digital computer that operates the program using a computer-readable recording medium. Further, the structure of data used for the method described above may be recorded in a computer-readable medium through various means. Program storing devices that may be used to describe a storage device including computer codes executable for implementation of various methods of the present invention should not be construed as including temporary objects such as carrier waves or signals. The computer-readable recording medium includes a storage medium such as a magnetic storage medium (e.g., a ROM, a floppy disk, and a hard disk) and an optically readable medium (e.g., a CD-ROM and a DVD).

It will be apparent to those skilled in the art that various modifications and variations can be made in the present invention without departing from the spirit or scope of the invention. Therefore, the above embodiments should be construed in all aspects as illustrative and not restrictive. The scope of the invention should be determined by the appended claims and their legal equivalents, not by the above description, and all changes coming within the meaning and equivalency range of the appended claims are intended to be embraced therein.

Various embodiments have been described in the best mode for carrying out the invention.

The invention claimed is:

1. A method of allocating a resource for a user equipment in a base station in a full duplex radio (FDR) communication environment, the method comprising:
   determining an FDR frequency band for performing FDR communication with a plurality of user equipments;
   selecting a first user equipment and a second user equipment among the plurality of user equipments, wherein a correlation between the first and second user equipments is less than a threshold value;
   allocating a first section as a downlink frequency resource for the first user equipment and an uplink frequency resource for the second user equipment, and allocating a second section as an uplink frequency resource for the first user equipment and a downlink frequency resource for the second user equipment, wherein the first section and the second section are parts of the FDR frequency band;
   receiving an uplink pilot signal from the plurality of user equipments; and
   measuring the correlation using the uplink pilot signal.

2. The method according to claim 1, further comprising:
   performing downlink communication with the first user equipment and uplink communication with the second user equipment simultaneously through the first section, and performing uplink communication with the first user equipment and downlink communication with the second user equipment simultaneously through the second section.

3. The method according to claim 1, wherein the measuring the correlation includes measuring an interference correlation that is between the user equipments and that indicates a distance between the user equipments within coverage of the base station, and
   wherein the interference correlation decreases as the distance increases.

4. The method according to claim 1, wherein the determining the FDR frequency band includes determining a frequency band allowing self interference cancellation to be performed to a degree greater than or equal to a threshold value through an antenna cancellation technique.

5. The method according to claim 1, wherein:
   the selecting comprises selecting a third user equipment in addition to the first user equipment and the second user equipment, a correlation between the first, second and third user equipments being less than a threshold value,
   wherein the allocating comprises allocating the first section as the downlink frequency resource for the first user equipment and the uplink frequency resource for the second user equipment, allocating the second section as the downlink frequency resource for the second user equipment and an uplink frequency resource for the third user equipment, and allocating a third section as a downlink frequency resource for the third user equipment and an uplink frequency resource for the first user equipment, and
   wherein the third section is another part of the FDR frequency band.

6. A base station for allocating a resource for a user equipment in a full duplex radio (FDR) communication environment, the base station comprising:
   a transmitter;
   a receiver; and
   a processor connected to the transmitter and the receiver to support resource allocation to the user equipment,
   wherein the processor:
      determines an FDR frequency band for conducting FDR communication with plurality of user equipments,
      selects a first user equipment and a second user equipment among the plurality of user equipments, a correlation between the first and second user equipments being less than a threshold value,
      allocates a first section as a downlink frequency resource for the first user equipment and an uplink frequency resource for the second user equipment, and a second section as an uplink frequency resource for the first user equipment and a downlink frequency resource for the second user equipment, wherein the first section and the second section are parts of the FDR frequency band, receives an uplink pilot signal from the plurality of user equipments, and measures the correlation using the uplink pilot signal.

7. The base station according to claim 6, wherein the processor performs downlink communication with the first user equipment and uplink communication with the second user equipment simultaneously through the first section, and performs uplink communication with the first user equipment and downlink communication with the second user equipment simultaneously through the second section.

8. The base station according to claim 6, wherein, to measure the correlation, the processor further measures an interference correlation that is between the user equipments and that indicates a distance between the user equipments within coverage of the base station, and
wherein the interference correlation decreases as the distance increases.

9. The base station according to claim 6, wherein, to determine the FDR frequency band, the processor further determines a frequency band allowing self interference cancellation to be performed to a degree greater than or equal to a threshold value through an antenna cancellation technique.

10. The base station according to claim 6, wherein the processor selects a third user equipment in addition to the first user equipment and the second user equipment, a correlation between the first, second and third user equipments being less than a threshold value,
wherein the processor allocates the first section as the downlink frequency resource for the first user equipment and the uplink frequency resource for the second user equipment, allocates the second section as the downlink frequency resource for the second user equipment and an uplink frequency resource for the third user equipment, and allocates a third section as a downlink frequency resource for the third user equipment and an uplink frequency resource for the first user equipment, and
wherein the third section is another part of the FDR frequency band.

* * * * *